United States Patent
Jung et al.

(10) Patent No.: US 6,683,740 B1
(45) Date of Patent: Jan. 27, 2004

(54) ARCHITECTURE FOR A HARD DISK DRIVE WRITE AMPLIFIER CIRCUIT WITH DAMPING CONTROL

(75) Inventors: Soon-Gil Jung, Sunnyvale, CA (US); Shang-Ching Dong, Santa Clara, CA (US); Hiroshi Takeuchi, Sunnyvale, CA (US); Norio Shoji, Yokohama (JP); Keiji Narusawa, Atsugi (JP); Michiya Sako, Atsugi (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/504,160

(22) Filed: Feb. 15, 2000

Related U.S. Application Data
(60) Provisional application No. 60/160,858, filed on Oct. 21, 1999.

(51) Int. Cl.$^7$ .................................................. G11B 5/02
(52) U.S. Cl. ............................ 360/67; 360/46; 360/68
(58) Field of Search .............................. 360/68, 46, 67

(56) References Cited

U.S. PATENT DOCUMENTS

| | | | |
|---|---|---|---|
| 5,060,089 A | 10/1991 | Cleveland | 360/51 |
| 5,101,117 A | 3/1992 | Johnson et al. | 307/269 |
| 5,282,094 A | 1/1994 | Ngo | 360/46 |
| 5,287,231 A | 2/1994 | Shier et al. | 360/68 |
| 5,386,328 A | 1/1995 | Chiou et al. | 360/68 |
| 5,392,172 A | 2/1995 | Yoshinaga et al. | 360/67 |
| 5,612,828 A | 3/1997 | Brannon et al. | 360/46 |
| 5,841,603 A | * 11/1998 | Ramalho et al. | 360/68 |
| 5,867,334 A | * 2/1999 | Soichi et al. | 360/68 |
| 5,956,281 A | 9/1999 | Nakai et al. | 365/222 |
| 6,128,146 A | * 10/2000 | Ngo | 360/46 |
| 6,211,709 B1 | 4/2001 | Kim | 327/172 |
| 6,246,269 B1 | * 6/2001 | Schuler et al. | 360/46 |
| 6,256,157 B1 | 7/2001 | Biskeborn et al. | 360/31 |
| 6,271,978 B1 | * 8/2001 | Block et al. | 360/46 |

FOREIGN PATENT DOCUMENTS

| | | | |
|---|---|---|---|
| EP | 0 758 782 A2 | 2/1997 | G11B/5/02 |
| JP | 3-187006 | 8/1991 | G11B/5/09 |
| JP | 5-290309 | 11/1993 | G11B/5/09 |

OTHER PUBLICATIONS

Patent Abstracts of Japan, Pub. No. 62183006, Nov. 8, 1987.

\* cited by examiner

*Primary Examiner*—David Hudspeth
*Assistant Examiner*—Rocio Colon
(74) *Attorney, Agent, or Firm*—Haverstock & Owens LLP (57) ABSTRACT

A write amplifier circuit in a magnetic storage system has a cross coupling circuit and an active damp circuit to supply an improved write current to the head writing the data onto the media within the magnetic storage system. The inclusion of the cross coupling circuit decreases a rise time and a fall time associated with the write current. The active damp circuit reduces the undershoot and ringing of the write current. Thus, the write amplifier circuit is suitable for high speed data storage writing applications requiring minimal distortion of the data written to a magnetic medium. The write amplifier circuit achieves these improvements in the waveform of the write current by incorporating circuit elements and using both a negative feedback path and a feedforward path. In particular, the cross coupling circuit provides a feedforward path within the write amplifier circuit to a first current which creates a second current that is proportional and greater than the first current such that the second current increases the write current available for the head. Similarly, the active damp circuit provides a negative feedback path from the output terminals of the write amplifier circuit to a third current which creates a fourth current that is proportional and greater than the third current such that the fourth current damps an undershoot and ringing associated with the write current.

35 Claims, 10 Drawing Sheets

ARCHITECTURE FOR A HARD DISK DRIVE WRITE AMPLIFIER CIRCUIT WITH DAMPING CONTROL

RELATED APPLICATIONS

This application claims priority under 35 U.S.C. § 119(e) of the co-pending U.S. provisional application Ser. No. 60/160,858 filed on Oct. 21, 1999 and entitled "Architecture For A Hard Disk Drive Write Amplifier Circuit With Damping Control." The provisional application Ser. No. 60/160,858 filed on Oct. 21, 1999 and entitled "Architecture For A Hard Disk Drive Write Amplifier Circuit With Damping Control" is also hereby incorporated by reference.

FIELD OF THE INVENTION

The present invention relates to the field of write amplifier circuits within magnetic storage systems. More particularly, the present invention relates to write amplifier circuits supplying a write current and having circuitry to improve response time and quality when recording data on a magnetic storage system.

BACKGROUND OF THE INVENTION

A magnetic storage system, such as a conventional hard disk drive, is generally used for mass storage of data. Typically, the conventional hard disk drive includes a magnetic medium, an inductive element positioned near the surface of the magnetic medium, and a write amplifier circuit which provides a write current to the inductive element. The magnetic medium usually includes one or more disks composed of a metallic material such as an aluminum alloy. A magnetizable coating is deposited on the disk surface and serves as a data medium.

Generally, the inductive element comprises a head which writes data onto the disk as small magnetizations in the data medium by converting the write current into a magnetic field which magnetizes the surface area of the disk below the head. The small magnetizations align according to the generated magnetic field and a "1" is written. By inverting the polarity of the magnetic field, the small magnetizations are also aligned, but in another direction, thus a "0" is written. The polarity of the magnetic field is inverted by changing the direction of the write current supplied to the head. The head is generally a ferrite head or a thinfilm head. The thinfilm head typically is smaller and lighter in weight than the ferrite head. The thinfilm head can be positioned closer to the disk surface than the ferrite head, thus requiring a less intense magnetic field to write data to the disk.

Figure 1:
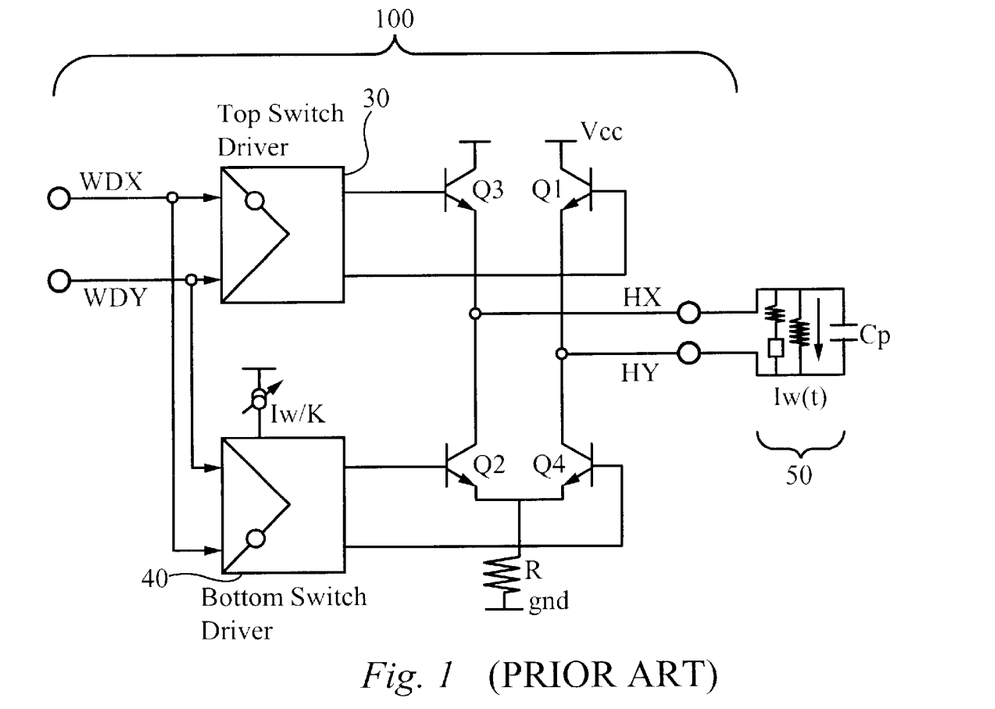
FIG. 1 illustrates a schematic diagram of a write amplifier circuit according to the prior art.

FIG. 1 illustrates a schematic diagram of the conventional write amplifier circuit 100. The conventional write amplifier circuit includes differential input signals WDX and WDY, a top switch driver 30, a bottom switch driver 40, output terminals HX and HY, and H-switch transistors Q1, Q2, Q3, and Q4. The head 50 is coupled to the output terminals HX and HY.

In practice, the differential input signals WDX and WDY determine whether the npn transistor Q3 and the npn transistor Q4 are turned on or whether the npn transistor Q1 and the npn transistor Q2 are turned on. If the transistors Q3 and Q4 are turned on, the write current Iw(t) travels from the emitter of the transistor Q3 to the output terminal HX. From the output terminal HX, the write current Iw(t) enters the head 50 and then returns to the output terminal HY. From the output terminal HY, the write current Iw(t) enters the collector of the transistor Q4. In essence, the transistor Q3 sources the write current Iw(t) while the transistor Q4 sinks the write current Iw(t).

If the transistors Q1 and Q2 are turned on, the transistor Q1 sources the write current Iw(t) while the transistor Q2 sinks the write current Iw(t). However, the write current Iw(t) enters the head 50 through the output terminal HY and then returns to the output terminal HX. Hence, the direction of the write current Iw(t) through the head 50 is opposite of the direction described above with respect to the situation when the transistors Q3 and Q4 are turned on. This change in the direction of the write current Iw(t) facilitates writing data as a "1" and a "0" on the disk surface.

The top switch driver 30 defines the DC voltages of the output terminals HX and HY and controls the H-switch transistors Q1 and Q3. The bottom switch driver 40 controls the H-switch transistors Q2 and Q4 and determines the DC current of the write current Iw(t). Additionally, the bottom switch driver 40 is coupled to a variable current source Iw/K.

The conventional write amplifier circuit 100 has a number of deficiencies. The write current Iw(t) supplied by the conventional write amplifier circuit 100 has a large undershoot and a long ringing. The undershoot and the ringing slow down the writing speed of the magnetic storage system, such as a hard disk drive, and distort the written data when the head converts the write current into a magnetic field. Therefore, the undershoot and the ringing affect the speed and the performance of a magnetic storage system including a conventional write amplifier circuit such as illustrated in FIG. 1.

SUMMARY OF THE INVENTION

A write amplifier circuit in a magnetic storage system has a cross coupling circuit and an active damp circuit to supply an improved write current to the head writing the data onto the media within the magnetic storage system. The inclusion of the cross coupling circuit decreases a rise time and a fall time associated with the write current. The active damp circuit reduces the undershoot and ringing of the write current. Thus, the write amplifier circuit is suitable for high speed data storage writing applications requiring minimal distortion of the data written to a magnetic medium. The write amplifier circuit achieves these improvements in the waveform of the write current by incorporating circuit elements and using both a negative feedback path and a feedforward path.

In particular, the cross coupling circuit provides a feedforward path within the write amplifier circuit to a first current which creates a second current that is proportional and greater than the first current such that the second current increases the write current available for the head.

Similarly, the active damp circuit provides a negative feedback path from the output terminals of the write amplifier circuit to a third current which creates a fourth current that is proportional and greater than the third current such that the fourth current damps an undershoot and ringing associated with the write current.

In one aspect of the present invention, a cross coupling circuit for decreasing a switching response time of a write current supplied to an inductive element by a write amplifier circuit including a first driving circuit having an output terminal, a second driving circuit having a current amplifier, and a switching circuit coupled to the first and second driving circuits and to the inductive element, wherein the inductive element writes data to a magnetic medium, includes a first terminal coupled to the output terminal for providing a feedforward path to a first current, a second terminal coupled to the current amplifier for supplying the first current to the current amplifier such that a second current which is proportional to and greater than the first current is simultaneously formed in the switching circuit, wherein the switching circuit supplies the write current to the inductive element such that the second current increases the write current available for the inductive element and a feedforward element coupled to the first terminal and to the second terminal for controlling the first current.

In another aspect of the present invention, a damping circuit for reducing an undershoot and a settling time of a write current supplied to an inductive element by a write amplifier circuit including a driving circuit having a current amplifier and a switching circuit coupled to the driving circuit and having a first output terminal coupled to the inductive element and a second output terminal coupled to the inductive element, wherein the inductive element writes data to a magnetic medium, includes a first terminal coupled to the first and second output terminals for providing a negative feedback path to a first current, a second terminal coupled to the current amplifier for supplying the first current to the current amplifier such that a second current which is proportional to and greater than the first current is simultaneously formed in the switching circuit, wherein the switching circuit supplies the write current to the inductive element such that the second current damps a ringing associated with the write current and an impedance element coupled to the first terminal and to the second terminal for adjusting a waveform of the first current to enhance a damping function performed by the second current on the write current.

In still another aspect of the present invention, a write amplifier circuit for supplying a write current to an inductive element that writes data to a magnetic medium, the write amplifier circuit includes a switching circuit coupled to the inductive element for providing the write current to the inductive element, wherein the switching circuit includes a first output terminal coupled to the inductive element and a second output terminal coupled to the inductive element, a first driving circuit coupled to the switching circuit for driving the switching circuit, wherein the first driving circuit includes an output terminal, a second driving circuit coupled to the switching circuit for driving the switching circuit, wherein the second driving circuit includes a current amplifier and a cross coupling circuit coupled to the first driving circuit and to the second driving circuit for decreasing a switching response time of the write current.

In yet another aspect of the present invention, a write amplifier circuit for supplying a write current to an inductive element that writes data to a magnetic medium, the write amplifier circuit includes a switching circuit coupled to the inductive element for providing the write current to the inductive element, wherein the switching circuit includes a first output terminal coupled to the inductive element and a second output terminal coupled to the inductive element, a first driving circuit coupled to the switching circuit for driving the switching circuit, wherein the first driving circuit includes an output terminal, a second driving circuit coupled to the switching circuit for driving the switching circuit, wherein the second driving circuit includes a current amplifier and a damping circuit coupled to the switching circuit and to the second driving circuit for reducing an undershoot and a settling time of the write current, the damping circuit including a feedback input coupled to the first and second output terminals for providing a negative feedback path to a first current, a feedback output coupled to the current amplifier for supplying the first current to the current amplifier such that a second current which is proportional to and greater than the first current is simultaneously formed in the switching circuit, wherein the second current damps a ringing associated with the write current and an impedance element coupled to the feedback input and to the feedback output for adjusting a waveform of the first current to enhance a damping function performed by the second current on the write current.

In still yet another aspect of the present invention, a magnetic storage system includes a magnetic medium for storing data, an inductive element for writing data to the magnetic medium by converting a write current to a magnetic field and a write amplifier circuit for supplying the write current to the inductive element, the write amplifier circuit including a switching circuit coupled to the inductive element for providing the write current to the inductive element, wherein the switching circuit includes a first output terminal coupled to the inductive element and a second output terminal coupled to the inductive element, a first driving circuit coupled to the switching circuit for driving the switching circuit, wherein the first driving circuit includes an output terminal, a second driving circuit coupled to the switching circuit for driving the switching circuit, wherein the second driving circuit includes a current amplifier and a cross coupling circuit coupled to the first driving circuit and to the second driving circuit for decreasing a switching response time of the write current.

DETAILED DESCRIPTION OF THE PREFERRED EMBODIMENT

Figure 3:
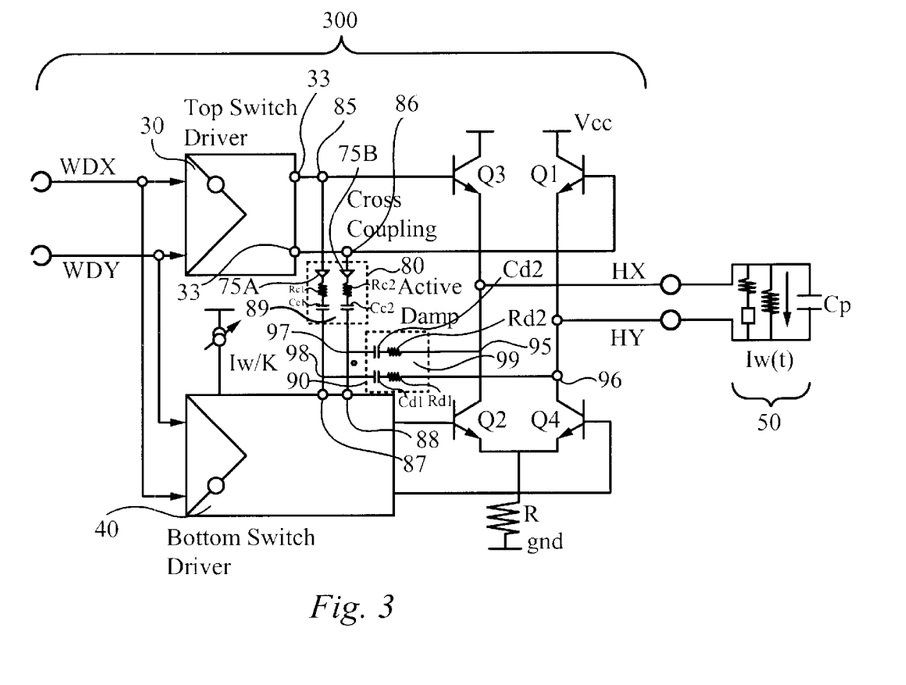
FIG. 3 illustrates a schematic diagram of a write amplifier circuit according to the present invention.

FIG. 3 illustrates a schematic diagram of a write amplifier circuit 300 according to the present invention. For clarity, unchanged components from the write amplifier of FIG. 1 retain the same labels. As shown in FIG. 3, the write amplifier circuit 300 incorporates a cross coupling circuit 80 and an active damp circuit 90 in addition to the components discussed above and included within the write amplifier circuit of FIG. 1.

The cross coupling circuit 80 preferably includes a first terminal, a second terminal, and a feedforward element 89. The first terminal is coupled in a differential arrangement to a differential output terminal 33 of the top switch driver 30 and includes the nodes 85 and 86. The second terminal 87 is coupled in a differential arrangement to the bottom switch driver 40 and includes the nodes 87 and 88. Within the bottom switch driver 40, the cross coupling circuit 80 is coupled to a current amplifier (not shown). The feedforward element 89 is coupled to the nodes 85 and 86 of the first terminal and to the nodes 87 and 88 of the second terminal and is configured as a differential circuit. The feedforward element 89 preferably includes a first resistor Rc1, a second resistor Rc2, a first capacitor Cc1, and a second capacitor Cc2. The first resistor Rc1 and the first capacitor Cc1 are coupled in series and form a first half circuit of the differential feedforward circuit. The second resistor Rc2 and the second capacitor Cc2 are coupled in series and form a second half circuit of the differential feedforward circuit. The feedforward element 89 further includes a first voltage buffer 75A and a second voltage buffer 75B. The first voltage buffer 75A is coupled to the node 85 of the first terminal and to the first resistor Rc1. The second voltage buffer 75B is coupled to the node 86 of the first terminal and to the second resistor Rc2.

The cross coupling circuit 80 is configured to provide additional AC write current to the head 50 during both positive and negative transitions in the write current Iw(t). This additional AC write current gives the write current Iw(t) a compensation current for the parasitic capacitor Cp across the output terminals HX and HY, thus decreasing a rise time and a fall time associated with each transition in the write current Iw(t).

The active damp circuit 90 preferably includes a feedback input, a feedback output, and an impedance element 99. The feedback input includes the nodes 95 and 96 coupled in a differential arrangement to the output terminal HX and the output terminal HY of the write amplifier circuit 300. Specifically, the node 95 of the feedback input is coupled to the output terminal HX and the node 96 of the feedback input is coupled to the output terminal HY. The feedback output includes the nodes 97 and 98 coupled in a differential arrangement to the bottom switch driver 40 and to the cross-coupling circuit 80. Specifically, the node 97 of the feedback output is coupled to the bottom switch driver 40 and to the capacitor Cc2 and the node 98 of the feedback output is coupled to the bottom switch driver 40 and to the capacitor Cc1.

Within the bottom switch driver 40, the active damp circuit 90 is coupled to a current amplifier (not shown). The impedance element 99 of the active damp circuit 90 is coupled to the feedback input and to the feedback output and is configured as a differential circuit. The impedance element 99 preferably includes a first resistor Rd1, a second resistor Rd2, a first capacitor Cd1, and a second capacitor Cd2. The first resistor Rd1 and the first capacitor Cd1 are coupled in series between the nodes 95 and 97 and form a first half circuit of the differential impedance circuit. The second resistor Rd2 and the second capacitor Cd2 are coupled in series between the nodes 96 and 98 and form a second half circuit of the differential impedance circuit.

The active damp circuit 90 provides a feedback loop from the output terminals HX and HY. This feedback loop adjusts a damping factor of the write amplifier circuit 300 such that the undershoot and ringing associated with the write current Iw(t) are reduced, thus decreasing a settling time associated with the write current Iw(t).

Figure 4:
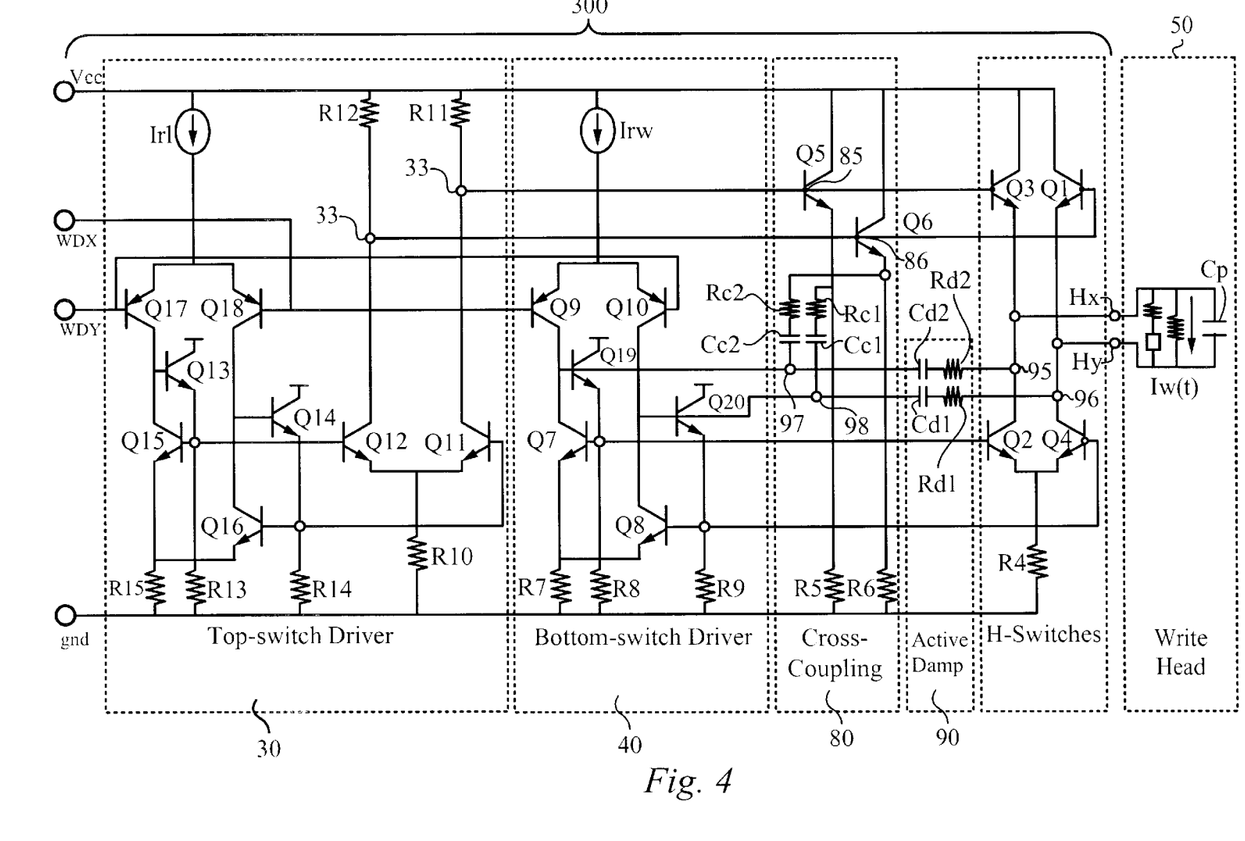
FIG. 4 illustrates a detailed schematic diagram of the preferred embodiment of the write amplifier circuit of the present invention.

FIG. 4 illustrates a detailed schematic diagram of the preferred embodiment of the write amplifier circuit 300 of the present invention.

In the top switch driver 30, the differential input signals WDX and WDY are coupled to the base of the pnp transistors Q18 and Q17, respectively. The transistors Q17 and Q18 are arranged in a current switch configuration with their emitters coupled to each other and to a current source Ir1 providing a current to the current switch. A "LOW" value on the differential input signals WDX and WDY causes the transistor Q18 to turn on and the transistor Q17 to be turned off. When a "LOW" value occurs on the differential input signals WDX and WDY, the input signal WDX is at a logical low voltage level and the input signal WDY is at a logical high voltage level. A "HIGH" value on the differential input signals WDX and WDY causes the transistor Q17 to turn on and the transistor Q18 to be turned off. When a "HIGH" value occurs on the differential input signals WDX and WDY, the input signal WDX is at a logical high voltage level and the input signal WDY is at a logical low voltage level.

The collector of the npn transistor Q15 is coupled to the collector of the transistor Q17 and to the base of the npn transistor Q13. The collector of the npn transistor Q16 is coupled to the collector of the transistor Q18 and to the base of the transistor Q14. Moreover, the base of the transistor Q15 is coupled to the base of the npn transistor Q12 and to the emitter of the transistor Q13. The base of the transistor Q16 is coupled to the base of the npn transistor Q11 and to the emitter of the transistor Q14. The emitters of the transistors Q15 and Q16 are coupled to each other and to a first terminal of the resistor R15. A second terminal of the resistor R15 is coupled to ground. A first terminal of the resistor R13 is coupled to the emitter of the transistor Q13 and to the bases of the transistors Q15 and Q12. A second terminal of the transistor R13 is coupled to ground. A first terminal of the resistor R14 is coupled to the emitter of the transistor Q14 and to the bases of the transistors Q16 and Q11. A second terminal of the transistor R14 is coupled to ground. The collectors of the transistors Q13 and Q14 are coupled to VCC.

The emitters of the transistors Q12 and Q11 are coupled to each other and to a first terminal of the resistor R10. A second terminal of the resistor R10 is coupled to ground. A first terminal of the resistor R12 is coupled to VCC. A second terminal of the resistor R12 is coupled to the collector of the transistor Q12. A first terminal of the resistor R11 is coupled to VCC. A second terminal of the resistor R11 is coupled to the collector of the transistor Q11. Moreover, the differential output terminal 33 of the top switch driver circuit 30 is formed at the collectors of the transistors Q12 and Q11.

The transistors Q15 and Q12 form a current mirror. When the transistor Q17 is on, the current mirror formed by the transistors Q15 and Q12 sinks current at the collector of the transistor Q12 and turns off the npn transistors Q6 and Q1, where the bases of the transistors Q6 and Q1 are coupled to the collector of the transistor Q12.

Similarly, the transistors Q16 and Q11 form a current mirror. When the transistor Q18 is on, the current mirror formed by the transistors Q16 and Q11 sinks current at the collector of the transistor Q11 and turns off the npn transistors Q5 and Q3, where the bases of the transistors Q5 and Q3 are coupled to the collector of the transistor Q11.

In the bottom switch driver 40, the differential input signals WDX and WDY are coupled to the base of the pnp transistors Q9 and Q10, respectively. The transistors Q9 and Q10 are arranged in a current switch configuration with their emitters coupled to each other and to a current source Irw providing a current to the current switch. A "LOW" value on the differential input signals WDX and WDY causes the transistor Q9 to turn on and the transistor Q10 to be turned off. A "HIGH" value on the differential input signals WDX and WDY causes the transistor Q10 to turn on and the transistor Q9 to be turned off.

The collector of the npn transistor Q7 is coupled to the collector of the transistor Q9 and to the base of the npn transistor Q19. The collector of the npn transistor Q8 is coupled to the collector of the transistor Q10 and to the base of the npn transistor Q20. Moreover, the base of the transistor Q7 is coupled to the base of the npn transistor Q2 and to the emitter of the transistor Q19. The base of the transistor Q8 is coupled to the base of the npn transistor Q4 and to the emitter of the transistor Q20. The emitters of the transistors Q7 and Q8 are coupled to each other and to a first terminal of the resistor R7. A second terminal of the resistor R7 is coupled to ground. A first terminal of the resistor R8 is coupled to the emitter of the transistor Q19 and to the bases of the transistors Q7 and Q2. A second terminal of the transistor R8 is coupled to ground. A first terminal of the resistor R9 is coupled to the emitter of the transistor Q20 and to the bases of the transistors Q8 and Q4. A second terminal of the transistor R9 is coupled to ground. The collectors of the transistors Q19 and Q20 are coupled to VCC.

The transistors Q7 and Q2 form a current mirror. When the transistor Q9 is on, the current mirror formed by the transistors Q7 and Q2 sinks current at the collector of the transistor Q2.

Similarly, the transistors Q8 and Q4 form a current mirror. When the transistor Q10 is on, the current mirror formed by the transistors Q8 and Q4 sinks current at the collector of the transistor Q4.

As described above, the write current Iw(t) to the head 50 is provided by the transistors Q3 and Q4 or by the transistors Q1 and Q2, depending on the value of the differential input signals WDX and WDY. The output terminal HX is coupled to the emitter of the transistor Q3 and to the collector of the transistor Q2. The output terminal HY is coupled to the emitter of the transistor Q1 and to the collector of the transistor Q4. Moreover, the collectors of the transistors Q3 and Q1 are coupled to VCC. The emitters of the transistors Q2 and Q4 are coupled to each other and to a first terminal of the resistor R4. A second terminal of the resistor R4 is coupled to ground.

As shown in FIG. 4, the npn transistor Q5 and the resistor R5 form the first voltage buffer 75A of the cross coupling circuit 80 while the npn transistor Q6 and the resistor R6 form the second voltage buffer 75B of the cross coupling circuit 80. A first terminal of the resistor R5 is coupled to the emitter of the transistor Q5. A second terminal of the resistor R5 is coupled to ground. A first terminal of the resistor R6 is coupled to the emitter of the transistor Q6. A second terminal of the resistor R6 is coupled to ground. The collectors of the transistors Q5 and Q6 are coupled to VCC. The first and second voltage buffers 75A and 75B provide an appropriate bias voltage to the feedforward element 89.

Within the cross-coupling circuit 80, a first terminal of the resistor Rc1 is coupled to the emitter of the transistor Q5 and to the first terminal of the resistor R5. A second terminal of the resistor Rc1 is coupled to a first terminal of the capacitor Cc1. A second terminal of the capacitor Cc1 is coupled to the base of the transistor Q20. A first terminal of the resistor Rc2 is coupled to the emitter of the transistor Q6 and to the first terminal of the resistor R6. A second terminal of the resistor Rc2 is coupled to a first terminal of the capacitor Cc2. A second terminal of the capacitor Cc2 is coupled to the base of the transistor Q19.

In practice, the cross coupling circuit 80 provides a feedforward path to an AC current that forms at the differential output terminal 33 of the top switch driver 30. The values of the first resistor Rc1 and the first capacitor Cc1 within the first half of the feedforward circuit control the features of the AC current, such as magnitude and delay, which is generated at the collector of the transistor Q11 and the bases of the transistors Q5 and Q3. The values of the second resistor Rc2 and the second capacitor Cc2 within the second half circuit of the feedforward circuit control the features of the AC current, such as magnitude and delay, which is generated at the collector of the transistor Q12 and the bases of the transistors Q6 and Q1. Generally, the AC current forms at the differential output terminal 33 only while the write current Iw(t) makes either a positive transition or a negative transition. The AC current generated at the collector of the transistor Q11 is directed to the collector of the transistor Q8 through the first half circuit of the feedforward circuit and the transistor Q20. The AC current generated at the collector of the transistor Q12 is directed to the collector of the transistor Q7 through the second half circuit of the feedforward circuit and the transistor Q19.

As explained above, the transistors Q7 and Q2 form a current mirror having the resistor R7 coupled to the emitter of the transistor Q7 and the resistor R4 coupled to the emitter of the transistor Q2. However, the transistor Q2 preferably has an emitter-base junction area that is 40 times as large as the emitter-base junction area of the transistor Q7. Hence, the AC current that reaches the collector of the transistor Q7 appears as an amplified AC current at the collector of the transistor Q2, where the current gain is 40. Using a current gain that is higher than 40 would require taking into consideration a DC current of the write current Iw(t) to avoid performance degradation of the write amplifier circuit 300. Additionally, a resistance ratio between the resistor R7 and the resistor R4 is preferably 40, which is equivalent to the current gain of the current amplifier implemented as a current mirror by the transistors Q7 and Q8 and the resistors R7 and R4.

Similarly, the transistors Q8 and Q4 form a current mirror having the resistor R7 coupled to the emitter of transistor Q8 and the resistor R4 coupled to the emitter of the transistor Q4. However, the transistor Q4 preferably has an emitter-base junction area that is 40 times as large as the emitter-base junction area of the transistor Q8. Hence, the AC current that reaches the collector of the transistor Q8 appears as an amplified AC current at the collector of the transistor Q4, where the current gain is 40.

The amplified AC current formed at the collectors of the transistors Q2 and Q4 increases the write current Iw(t) available for the head 50 during the positive and negative transitions of the write current Iw(t). This results in a shorter rise time and a shorter fall time for the write current Iw(t). In terms of a transfer function of the write amplifier circuit 300, the cross coupling circuit 90 adds a zero to the transfer function.

Within the active damp circuit 90, a first terminal of the resistor Rd1 is coupled to the output terminal HY, to the collector of the transistor Q4 and to the emitter of the transistor Q1. A second terminal of the resistor Rd1 is coupled to a first terminal of the capacitor Cd1. A second terminal of the capacitor Cd1 is coupled to the second terminal of the capacitor Cc1 and to the base of the transistor Q20. A first terminal of the resistor Rd2 is coupled to the output terminal HX, to the collector of the transistor Q2 and to the emitter of the transistor Q3. A second terminal of the resistor Rd2 is coupled to a first terminal of the capacitor Cd2. A second terminal of the capacitor Cd2 is coupled to the second terminal of the capacitor Cc2 and to the base of the transistor Q19.

In practice, the active damp circuit 90 provides a feedback path to a second AC current from the output terminal HX and the output terminal HY. The first resistor Rd1 and the first capacitor Cd1 control the features of the second AC current, such as magnitude, delay, and waveform, which is generated at the output terminal HY. The second resistor Rd2 and the second capacitor Cd2 control the features of the second AC current, such as magnitude, delay, and waveform, which is generated at the output terminal HX. The second AC current generated at the output terminal HY is directed to the collector of the transistor Q8 through the transistor Q20. The second AC current generated at the output terminal HX is directed to the collector of the transistor Q7 through the transistor Q19. More importantly, the second AC current generated at the output terminal HY is amplified by the current mirror formed by the transistors Q8 and Q4 while the second AC current generated at the output terminal HX is amplified by the current mirror formed by the transistors Q7 and Q2, as described above.

The amplified second AC current damps a ringing associated with the write current Iw(t) and reduces an undershoot associated with the write current Iw(t). In terms of a transfer function of the write amplifier circuit 300, the active damp circuit 90 reduces a damping factor associated with the transfer function.

Referring to FIG. 4, when the value of the differential input signals WDX and WDY transitions from a "HIGH" to a "LOW" within the top switch driver 30, the transistor Q18 is turned on while the transistor Q17 is turned off. Since the transistor Q18 is turned on, current from the current source Ir1 is sourced by the collector of the transistor Q18 to the collector of the transistor Q16 and to the base of the transistor Q14, turning on the transistor Q14. Thus, the current mirror formed by the transistors Q16 and Q11 is turned on and the transistor Q14 provides a base current to the bases of the transistors Q16 and Q11, causing the collector of the transistor Q11 to sink current. The current at the collector of the transistor Q11 causes a voltage drop across the resistor R11 which turns off the transistors Q5 and Q3, where the emitter of the transistor Q3 stops sourcing the write current Iw(t) to the head 50 through the output terminal HX. Since the transistor Q17 is turned off, current from the current source Ir1 is no longer sourced by the collector of the transistor Q17 to the collector of the transistor Q15 and to the base of the transistor Q13, turning off the transistor Q13. Thus, the current mirror formed by the transistors Q15 and Q12 is turned off and the transistor Q13 does not provide the base current to the bases of the transistors Q15 and Q12, causing the collector of the transistor Q12 to stop sinking current. Due to the lack of current at the collector of the transistor Q12 there is no voltage drop across the resistor R12 which accordingly turns on the transistors Q6 and Q1. The emitter of the transistor Q1 sources the write current Iw(t) to the head 50 through the output terminal HY.

Referring to FIG. 4, when the value of the differential input signals WDX and WDY transitions from a "HIGH" to a "LOW" within the bottom switch driver 40, the transistor Q9 is turned on while the transistor Q10 is turned off. Since the transistor Q9 is turned on, current from the current source Irw is sourced by the collector of the transistor Q9 to the collector of the transistor Q7 and to the base of the transistor Q19, turning on the transistor Q19. Thus, the current mirror formed by the transistors Q7 and Q2 is turned on and the transistor Q19 provides a base current to the bases of the transistors Q7 and Q2, causing the collector of the transistor Q2 to sink current. The current at the collector of the transistor Q2 sinks the write current Iw(t) from the head 50 through the output terminal HX. Since the transistor Q10 is turned off, current from the current source Irw is no longer sourced by the collector of the transistor Q10 to the collector of the transistor Q8 and to the base of the transistor Q20, turning off the transistor Q20. Thus, the current mirror formed by the transistors Q8 and Q4 is turned off and the transistor Q20 does not provide the base current to the bases of the transistors Q8 and Q4, causing the collector of the transistor Q4 to stop sinking the write current Iw(t) to the head 50 through the output terminal HY.

During this activation and deactivation of the transistors in the top switch driver 30, a collector current at the collector of the transistor Q11 includes an AC current component. Additionally, during this activation and deactivation of the transistors in the top switch driver 30, the write current Iw(t) makes a negative transition. The AC current component is directed to the collector of the transistor Q7 via the transistor Q6, the second resistor Rc2, and the second capacitor Cc2, such that the AC current appears as an amplified AC current at the collector of the transistor Q2, as described above.

Moreover, an AC feedback current at the output terminal HX is directed to the collector of the transistor Q7 via the second resistor Rd2 and the second capacitor Cd2 such that the AC feedback current appears as an amplified AC feedback current at the collector of the transistor Q2, as described above.

Referring to FIG. 4, when the value of the differential input signals WDX and WDY transitions from a "LOW" to a "HIGH" within the top switch driver 30, the transistor Q17 is turned on while the transistor Q18 is turned off. Since the transistor Q17 is turned on, current from the current source Ir1 is sourced by the collector of the transistor Q17 to the collector of the transistor Q15 and to the base of the transistor Q13, turning on the transistor Q13. Thus, the current mirror formed by the transistors Q15 and Q12 is turned on and the transistor Q13 provides a base current to the bases of the transistors Q15 and Q12, causing the collector of the transistor Q12 to sink current. The current at the collector of the transistor Q12 causes a voltage drop across the resistor R12 which turns off the transistors Q6 and Q1, where the emitter of the transistor Q1 stops sourcing the write current Iw(t) to the head 50 through the output terminal HY. Since the transistor Q18 is turned off, current from the current source Ir1 is no longer sourced by the collector of the transistor Q18 to the collector of the transistor Q16 and to the base of the transistor Q14, turning off the transistor Q14. Thus, the current mirror formed by the transistors Q16 and Q11 is turned off and the transistor Q14 does not provide the base current to the bases of the transistors Q16 and Q11, causing the collector of the transistor Q11 to stop sinking current. Due to the lack of current at the collector of the transistor Q11 there is no voltage drop across the resistor R11 which accordingly turns on the transistors Q5 and Q3. The emitter of the transistor Q3 sources the write current Iw(t) to the head 50 through the output terminal HX.

Referring to FIG. 4, when the value of the differential input signals WDX and WDY transitions from a "LOW" to a "HIGH" within the bottom switch driver 40, the transistor Q10 is turned on while the transistor Q9 is turned off. Since the transistor Q10 is turned on, current from the current source Irw is sourced by the collector of the transistor Q10 to the collector of the transistor Q8 and to the base of the transistor Q20, turning on the transistor Q20. Thus, the current mirror formed by the transistors Q8 and Q4 is turned on and the transistor Q20 provides a base current to the bases of the transistors Q8 and Q4, causing the collector of the transistor Q4 to sink current. The current at the collector of the transistor Q4 sinks the write current Iw(t) from the head 50 through the output terminal HY. Since the transistor Q9 is turned off, current from the current source Irw is no longer sourced by the collector of the transistor Q9 to the collector of the transistor Q7 and to the base of the transistor Q19, turning off the transistor Q19. Thus, the current mirror formed by the transistors Q7 and Q2 is turned off and the transistor Q19 does not provide the base current to the bases of the transistors Q7 and Q2, causing the collector of the transistor Q2 to stop sinking the write current Iw(t) to the head 50 through the output terminal HX.

During this activation and deactivation of the transistors in the top switch driver 30, a collector current at the collector of the transistor Q12 includes an AC current component. Additionally, during this activation and deactivation of the transistors in the top switch driver 30, the write current Iw(t) makes a positive transition. The AC current component is directed to the collector of the transistor Q8 via the transistor Q5, the first resistor Rc1, and the first capacitor Cc1, such that the AC current appears as an amplified AC current at the collector of the transistor Q4, as described above.

Moreover, an AC feedback current at the output terminal HY is directed to the collector of the transistor Q8 via the first resistor Rd1 and the second capacitor Cd1 such that the AC feedback current appears as an amplified AC feedback current at the collector of the transistor Q4, as described above.

Figure 2:
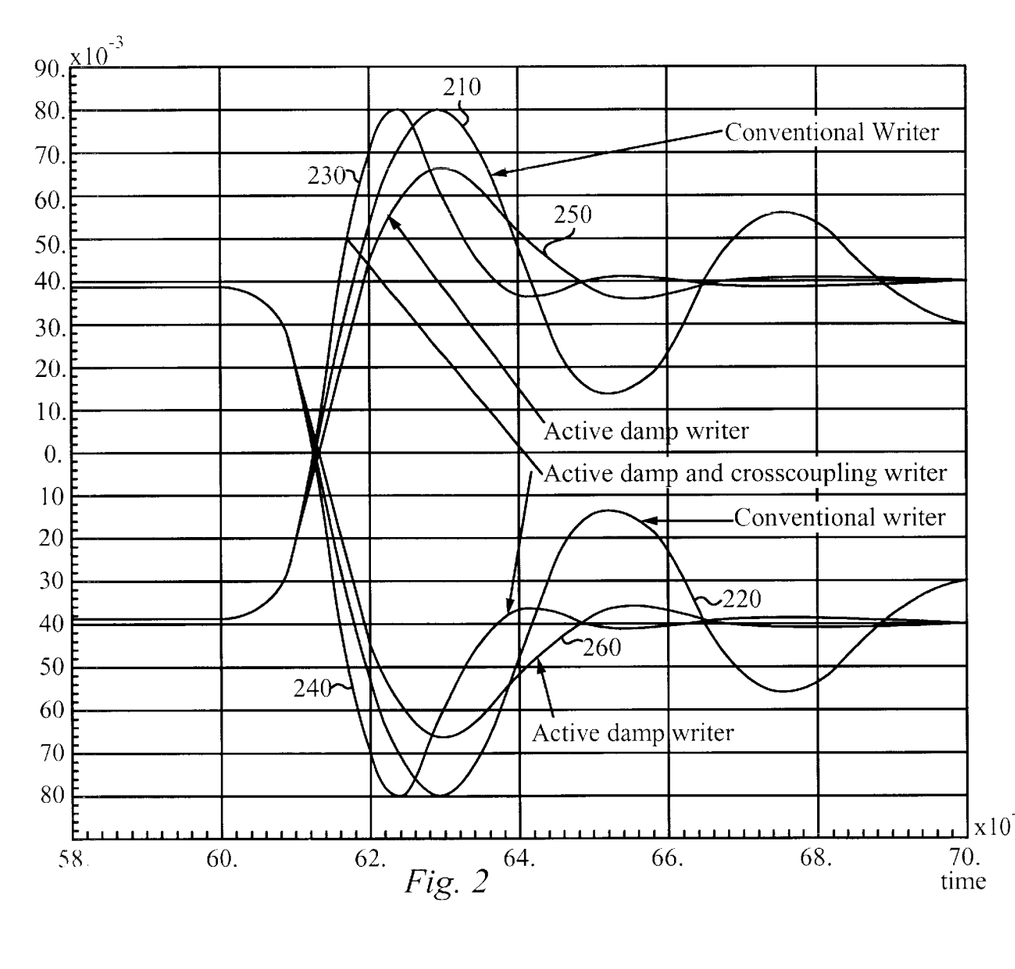
FIG. 2 illustrates a plurality of waveforms representing the write current supplied by different write amplifier circuits.

FIG. 2 illustrates a plurality of waveforms representing the write current supplied by different write amplifier circuits.

Waveforms 210 and 220 represent the write current supplied by a write amplifier circuit of the prior art, which does not have the cross coupling circuit and the active damp circuit of the present invention. Waveform 210 shows the undershoot and the ringing of the write current caused by a positive transition in the write current. Waveform 220 shows the undershoot and the ringing of the write current caused by a negative transition in the write current.

Additionally, waveforms 250 and 260 represent the write current supplied by a write amplifier circuit having only the active damp circuit. This illustrates the reduction in undershoot and ringing associated with the write current that is achieved by the active damp circuit. However, the rise and fall times of waveforms 250 and 260 are worse than for the waveforms 210 and 220, representing the write current supplied by a write amplifier of the prior art.

In contrast, waveforms 230 and 240 represent the write current supplied by a write amplifier circuit of the present invention, having the cross coupling circuit and the active damp circuit. Waveforms 230 and 240 illustrate an improvement in the fall and rise times associated with the write current and an improvement in the undershoot and ringing associated with the write current.

Figure 5A:
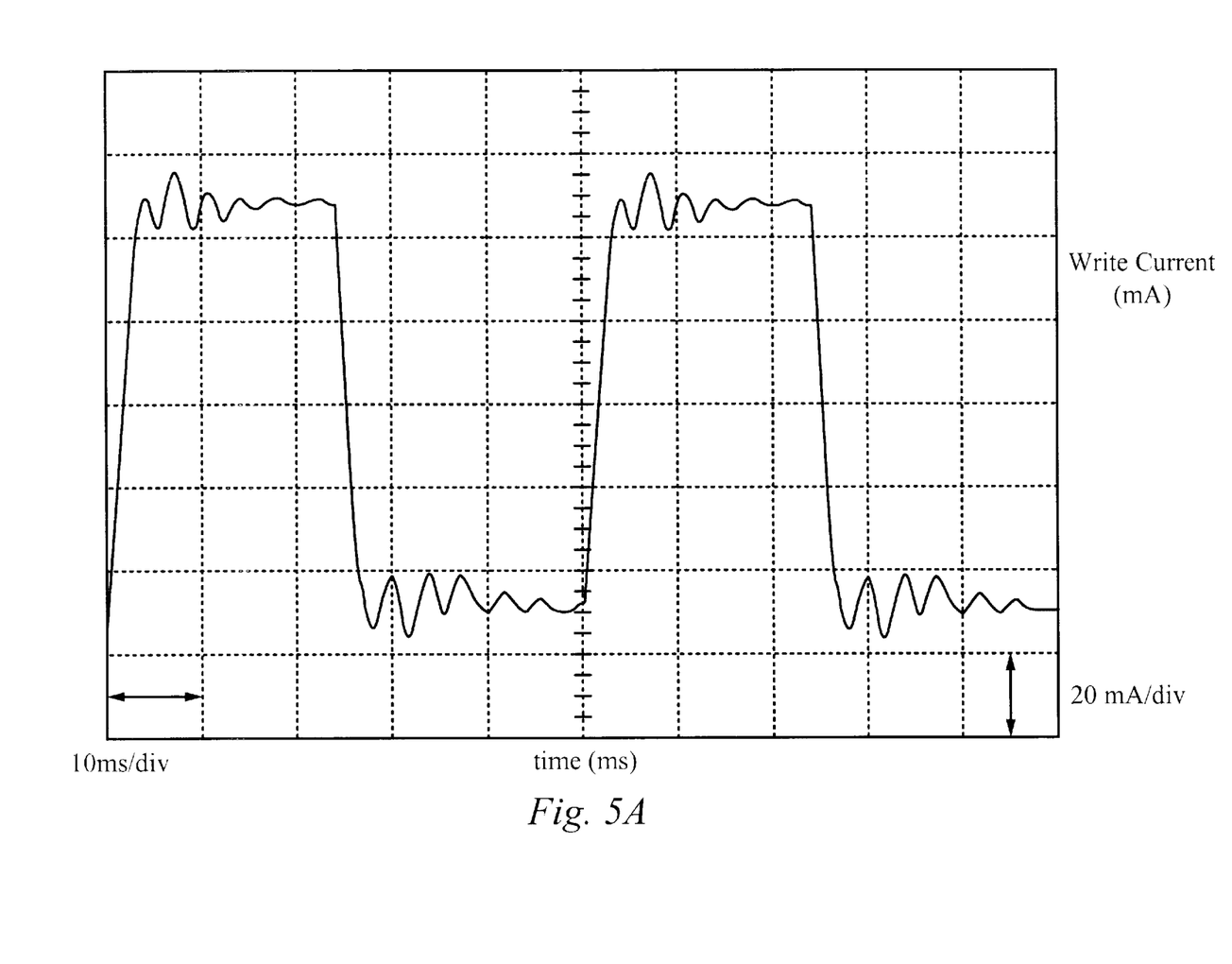
FIGS. 5A–C illustrate waveforms representing the write current supplied by a write amplifier circuit of the prior art.
Figure 5B:
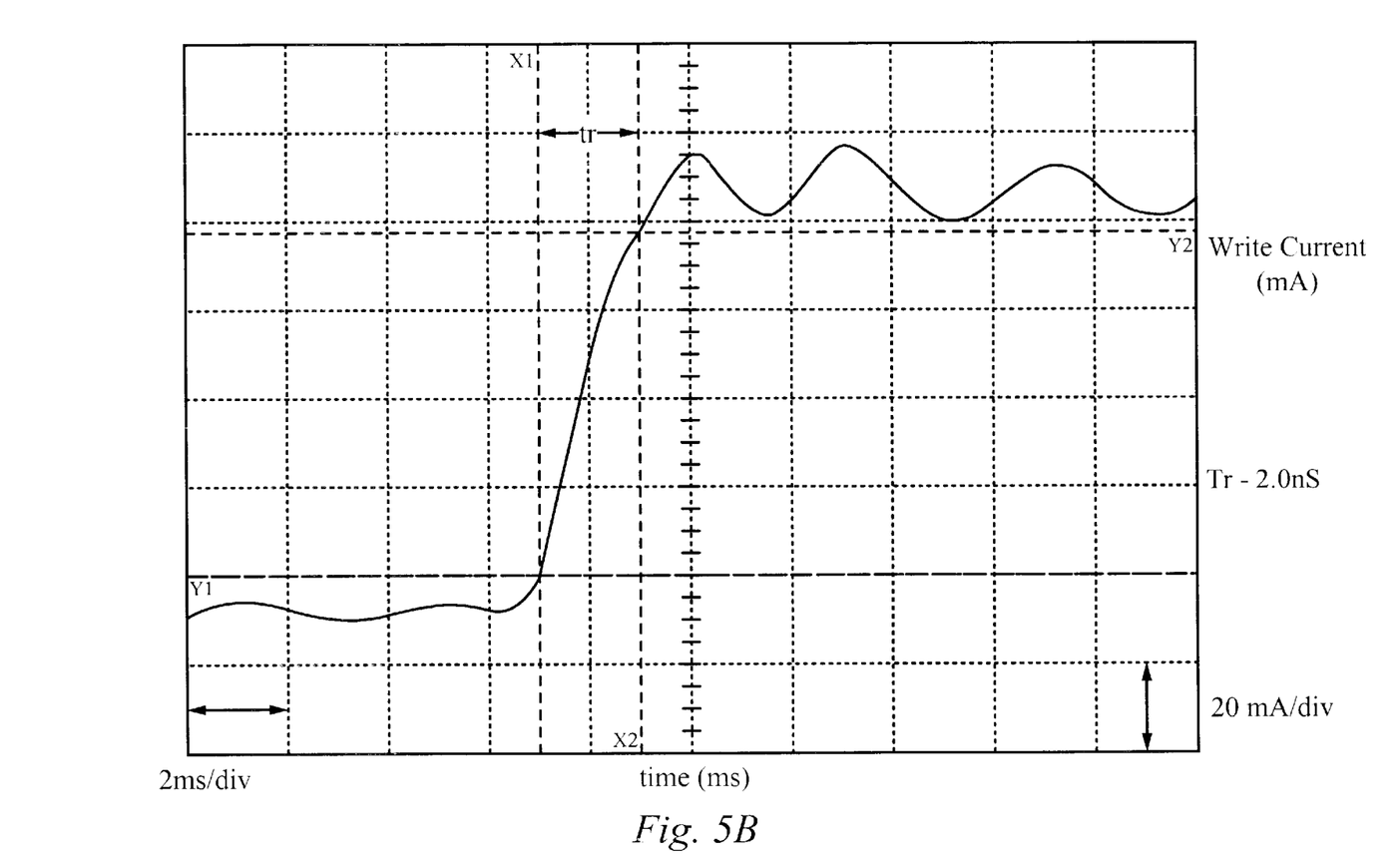
Figure 5C:
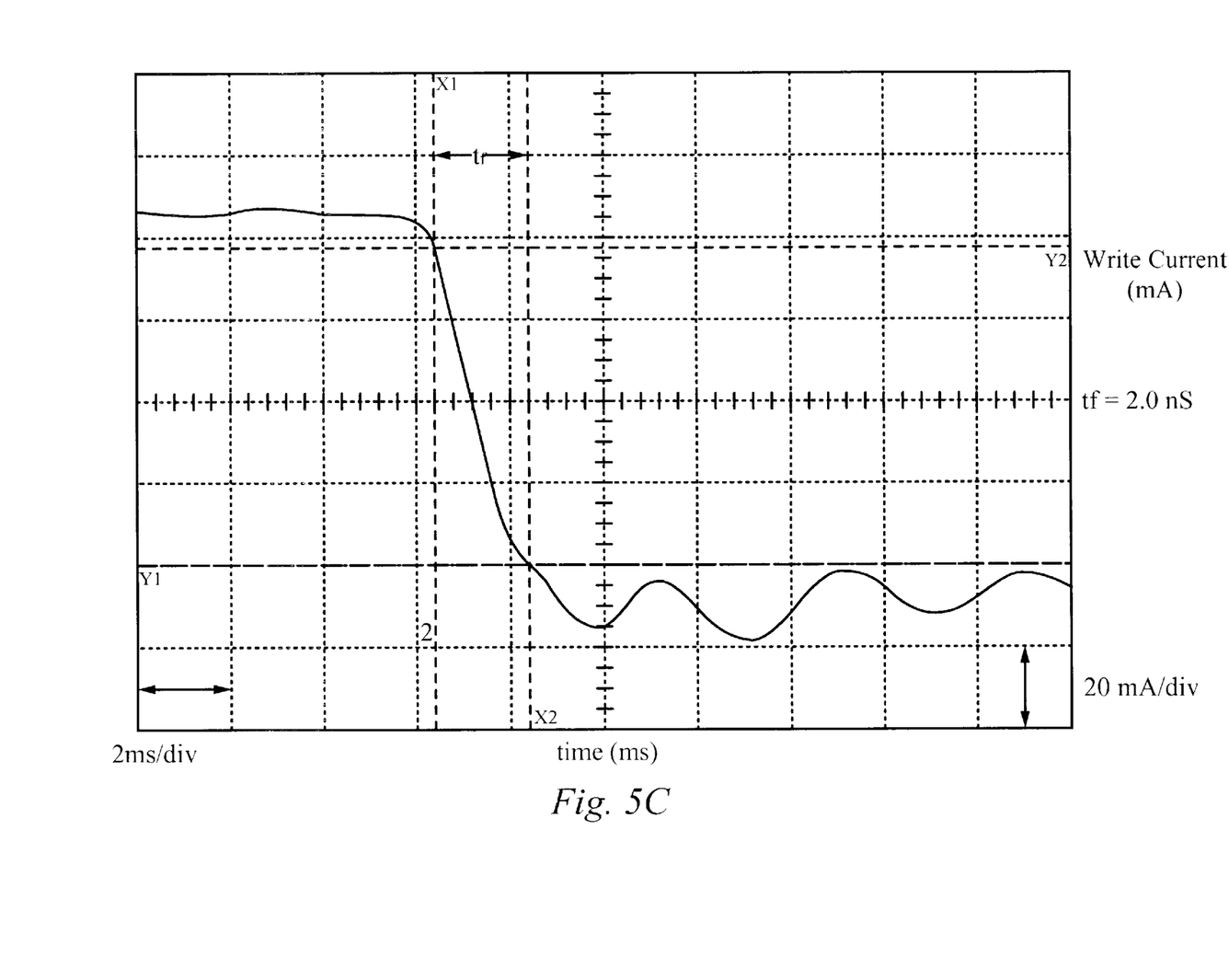

FIGS. 5A–C illustrate waveforms representing the write current supplied by a write amplifier circuit of the prior art. The write current is supplied to a 33nH inductor and two 8.2 ohm resistors, representing a model for a head. From FIGS. 5B and 5C, it can be observed that the write amplifier circuit of the prior art provides a write current having a 2 ns rise time $t_r$ and a 2 ns fall time $t_f$.

Figure 6A:
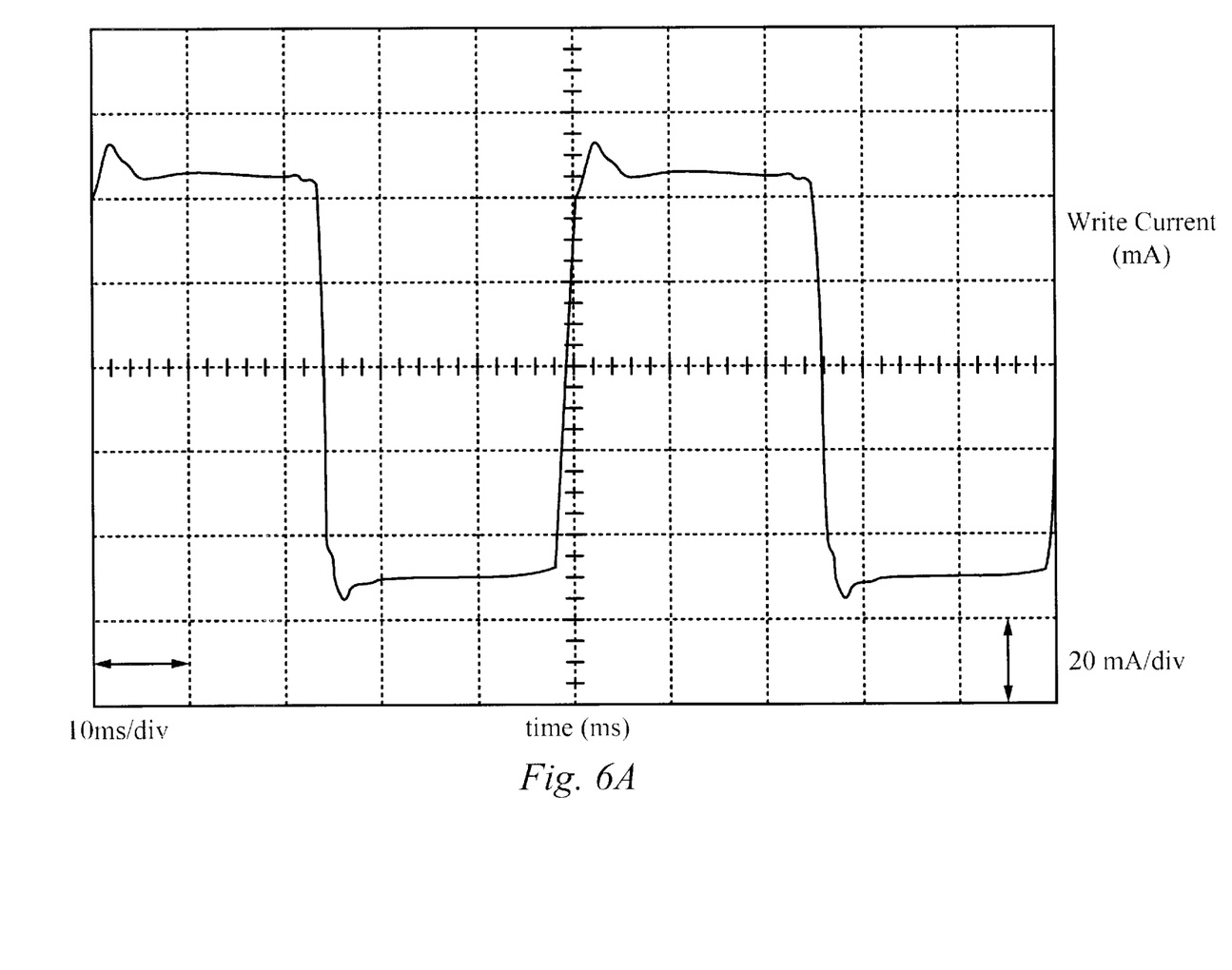
FIGS. 6A–C illustrate waveforms representing the write current supplied by a write amplifier circuit of the present invention.
Figure 6B:
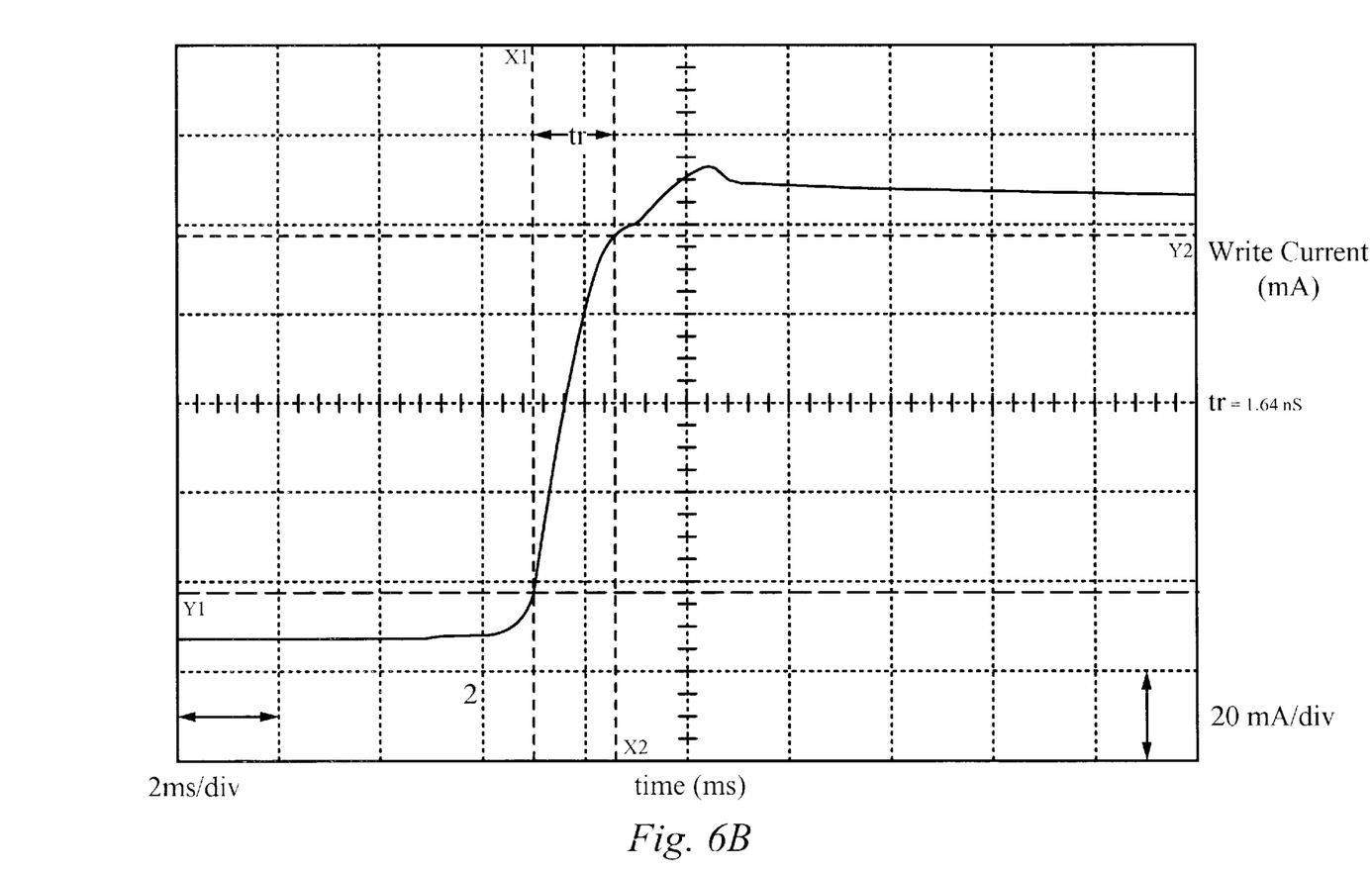
Figure 6C:
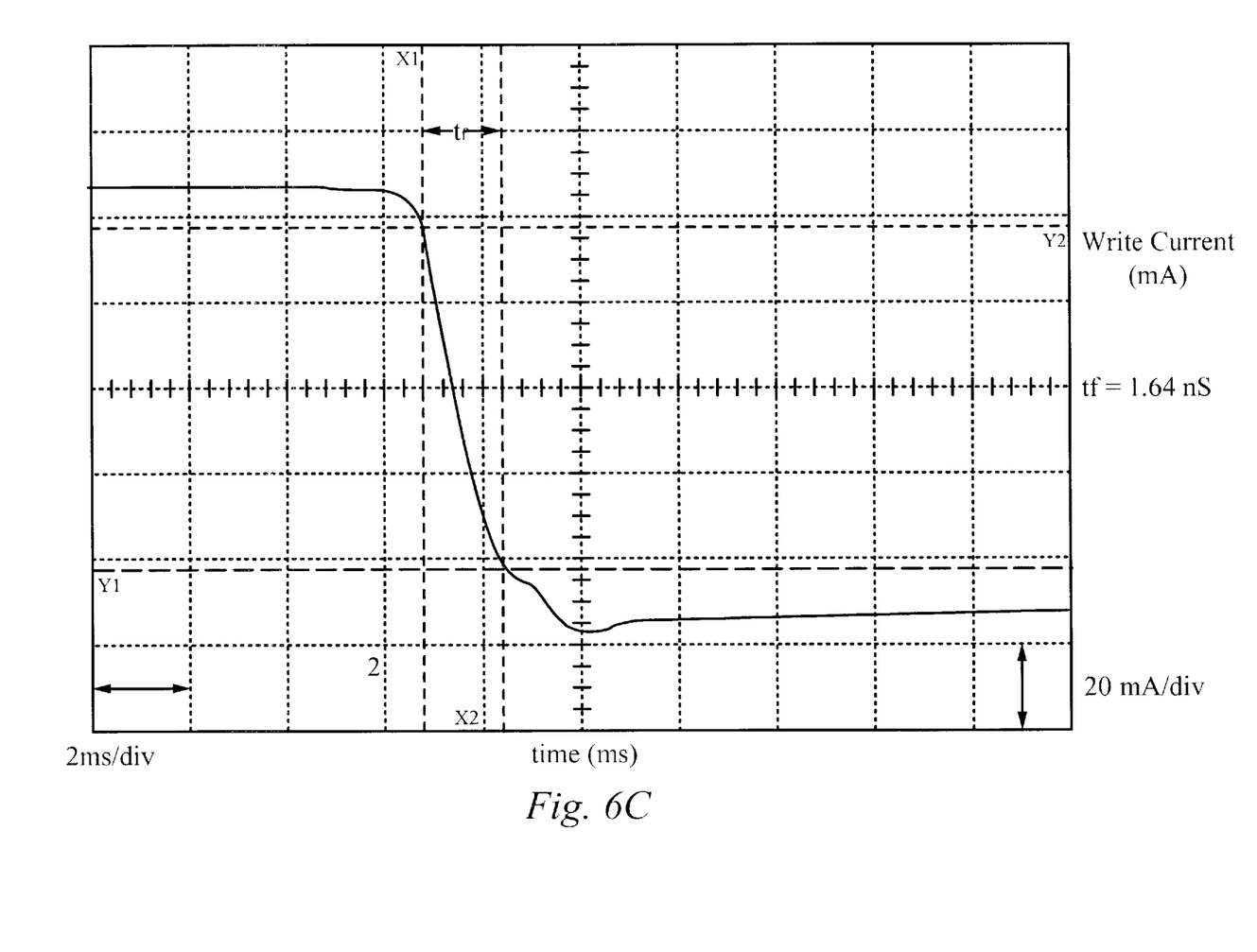

FIGS. 6A–C illustrate waveforms representing the write current supplied by a write amplifier circuit of the present invention, having the cross coupling circuit and the active damp circuit. The write current is supplied to a 33nH inductor and two 8.2 ohm resistors, representing a model for a head. From FIGS. 6B and 6C, it can be observed that the write amplifier circuit of the present invention provides a write current having a 1.64 ns rise time $t_r$, a 1.64 ns fall time $t_f$, and reduced ringing and undershoot. As illustrated by these waveforms, the write amplifier circuit of the present invention provides a marked improvement over the performance of the write amplifier circuit of the prior art.

The above figures are merely intended to illustrate a particular implementation of the present invention, but are not intended to limit the scope of the present invention to this particular implementation.

The present invention has been described in terms of specific embodiments incorporating details to facilitate the understanding of the principles of construction and operation of the invention. Such reference herein to specific embodiments and details thereof is not intended to limit the scope of the claims appended hereto. While the preferred embodiment of the present invention has been illustrated and described as a circuit using bipolar transistors, it will be apparent to a person of ordinary skill in the art that the circuit of the present invention may be implemented using another device technology such as CMOS, MOS, or any other appropriate device technology. It will be apparent to those skilled in the art that modifications may be made in the embodiments chosen for illustration without departing from the spirit and scope of the invention.

What is claimed is:

1. A cross coupling circuit for decreasing a switching response time of a write current supplied to an inductive element by a write amplifier circuit including a first driving circuit having an output terminal, a second driving circuit having a current amplifier, and a switching circuit coupled to the first and second driving circuits and to the inductive element, wherein the inductive element writes data to a magnetic medium, the cross coupling circuit comprising:

a. a first terminal coupled to the output terminal for providing a feedforward path to a first current, wherein the first current enters the first terminal during a switching transition of the write current;

b. a second terminal coupled to the current amplifier for supplying the first current to the current amplifier such that a second current which is proportional to and greater than the first current is simultaneously formed in the switching circuit, wherein the switching circuit supplies the write current to the inductive element such that the second current increases the write current available for the inductive element; and c. a feedforward element coupled to the first terminal and to the second terminal for controlling the first current.

2. The cross coupling circuit according to claim 1 wherein the first current is a first AC current.

3. The cross coupling circuit according to claim 1 wherein the second current is a second AC current.

4. The cross coupling circuit according to claim 1 wherein the feedforward element includes a resistor and a capacitor coupled in series between the first terminal and the second terminal, and each configured to control a magnitude of the first current.

5. The cross coupling circuit according to claim 4 wherein the feedforward element further includes a voltage buffer coupled to the first terminal and to the resistor for providing an appropriate bias voltage to the feedforward element.

6. The cross coupling circuit according to claim 5 wherein the feedforward element is configured for coupling in a differential arrangement to the output terminal and to the current amplifier.

7. The cross coupling circuit according to claim 1 wherein the current amplifier comprises a current mirror having a first transistor positioned within the second driving circuit and a second transistor positioned within the switching circuit and coupled to the first transistor, and further wherein the second transistor is configured to conduct an amplified current that is proportional to and greater than an unamplified current conducted by the first transistor.

8. The cross, coupling circuit according to claim 7 wherein the current mirror further includes a first reference resistor coupled to the first transistor for receiving the current conducted by the first transistor and a second reference resistor coupled to the second transistor for receiving the current conducted by the second transistor, wherein the first reference resistor is configured to have a resistance that is proportional to and greater than a resistance of the second reference resistor.

9. The cross coupling circuit according to claim 8 wherein a current ratio between the amplified current conducted by the second transistor and the unamplified current conducted by the first transistor is 40.

10. The cross coupling circuit according to claim 9 wherein a resistance ratio between the resistance of the first reference resistor and the resistance of the second reference resistor is 40.

11. A damping circuit for reducing an undershoot and a settling time of a write current supplied to an inductive element by a write amplifier circuit including a driving circuit having a current amplifier and a switching circuit coupled to the driving circuit and having a first output terminal coupled to the inductive element and a second output terminal coupled to the inductive element, wherein the inductive element writes data to a magnetic medium, the damping circuit comprising:
  a. a first terminal coupled to the first and second output terminals for providing a negative feedback path to a first current;
  b. a second terminal coupled to the current amplifier for supplying the first current to the current amplifier such that a second current which is proportional to and greater than the first current is simultaneously formed in the switching circuit, wherein the switching circuit supplies the write current to the inductive element such that the second current damps a ringing associated with the write current, and further wherein the current amplifier comprises a current mirror having:
    i. a first transistor positioned within the driving circuit;
    ii. a second transistor positioned within the switching circuit and coupled to the first transistor, wherein the second transistor is configured to conduct an amplified current that is proportional to and greater than an unamplified current conducted by the first transistor;
    iii. a first reference resistor coupled-to the first transistor for receiving the current conducted by the first transistor; and
    iv. a second reference resistor coupled to the second transistor for receiving the current conducted by the second transistor, wherein the first reference resistor is configured to have a resistance that is proportional to and greater than a resistance of the second reference resistor; and
  c. an impedance element coupled to the first terminal and to the second terminal for adjusting a waveform of the first current to enhance a damping function performed by the second current on the write current.

12. The damping circuit according to claim 11 wherein the first current is a first AC current.

13. The damping circuit according to claim 11 wherein the second current is a second AC current.

14. The damping circuit according to claim 11 wherein the impedance element includes a resistor and a capacitor coupled in series between the first terminal and the second terminal, and each configured to control a waveform of the first current.

15. The damping circuit according to claim 14 wherein the impedance element is configured for coupling in a differential arrangement to the first and second output terminals and to the current amplifier.

16. The damping circuit according to claim 11 wherein a current ratio between the amplified current conducted by the second transistor and the unamplified current conducted by the first transistor is 40.

17. The damping circuit according to claim 16 wherein a resistance ratio between the resistance of the first reference resistor and the resistance of the second reference resistor is 40.

18. A write amplifier circuit for supplying a write current to an inductive element that writes data to a magnetic medium, the write amplifier circuit comprising:
  a. a switching circuit coupled to the inductive element for providing the write current to the inductive element, wherein the switching circuit includes a first output terminal coupled to the inductive element and a second output terminal coupled to the inductive element;
  b. a first driving circuit coupled to the switching circuit for driving the switching circuit, wherein the first driving circuit includes an output terminal;
  c. a second driving circuit coupled to the switching circuit for driving the switching circuit, wherein the second driving circuit includes a current amplifier wherein the current amplifier comprises a current mirror having:
    i. a first transistor positioned within the second driving circuit;
    ii. a second transistor positioned within the switching circuit and coupled to the first transistor, wherein the second transistor is configured to conduct an amplified current that is proportional to and greater than an unamplified current conducted by the first transistor;
    iii. a first reference resistor coupled to the first transistor for receiving the current conducted by the first transistor; and
    iv. a second reference resistor coupled to the second transistor for receiving the current conducted by the second transistor, wherein the first reference resistor is configured to have a resistance that is proportional to and greater than a resistance of the second reference resistor; and
  d. a cross coupling circuit coupled to the first driving circuit and to the second driving circuit for decreasing a switching response time of the write current.

19. The write amplifier circuit according to claim 18 wherein the cross coupling circuit includes:
  a. a first terminal coupled to the output terminal for providing a feedforward path to a first current;
  b. a second terminal coupled to the current amplifier for supplying the first current to the current amplifier such that a second current which is proportional to and greater than the first current is simultaneously formed in the switching circuit, wherein the second current increases the write current available for the inductive element; and
  c. a feedforward element coupled to the first terminal and to the second terminal for controlling the first current.

20. The write amplifier circuit according to claim 19 wherein the feedforward element includes a resistor and a capacitor coupled in series between the first terminal and the second terminal, and each configured to control a magnitude of the first current.

21. The write amplifier circuit according to claim 20 wherein the feedforward element further includes a voltage buffer coupled to the first terminal and to the resistor for providing an appropriate bias voltage to the feedforward element.

22. The write amplifier circuit according to claim 21 wherein the feedforward element is configured for coupling in a differential arrangement to the output terminal and to the current amplifier.

23. The write amplifier circuit according to claim 18 further comprising a damping circuit coupled to the switching circuit and the second driving circuit for reducing an undershoot and a settling time of the write current.

24. The write amplifier circuit according to claim 23 wherein the damping circuit includes:
 a. a feedback input coupled to the first and second output terminals for providing a negative feedback path to a third current;
 b. a feedback output coupled to the current amplifier for supplying the third current to the current amplifier such that a fourth current which is proportional to and greater than the third current is simultaneously formed in the switching circuit, wherein the fourth current damps a ringing associated with the write current; and
 c. an impedance element coupled to the feedback input and to the feedback output for adjusting a waveform of the third current to enhance a damping function performed by the fourth current on the write current.

25. The write amplifier circuit according to claim 24 wherein the impedance element includes a feedback resistor and a feedback capacitor coupled in series between the feedback input and the feedback output, and each configured to control a waveform of the third current.

26. The write amplifier circuit according to claim 25 wherein the impedance element is configured for coupling in a differential arrangement to the first and second output terminals and to the current amplifier.

27. A magnetic storage system comprising:
 a. a magnetic medium for storing data;
 b. an inductive element for writing data to the magnetic medium by converting a write current to a magnetic field; and
 c. a write amplifier circuit for supplying the write current to the inductive element, the write amplifier circuit including:
  i. a switching circuit coupled to the inductive element for providing the write current to the inductive element, wherein the switching circuit includes a first output terminal coupled to the inductive element and a second output terminal coupled to the inductive element;
  ii. a first driving circuit coupled to the switching circuit for driving the switching circuit, wherein the first driving circuit includes an output terminal;
  iii. a second driving circuit coupled to the switching circuit for driving the switching circuit, wherein the second driving circuit includes a current amplifier, wherein the current amplifier comprises a current mirror having:
   1. a first transistor positioned within the second driving circuit;
   2. a second transistor positioned within the switching circuit and coupled to the first transistor wherein the second transistor is configured to conduct an amplified current that is proportional to and greater than an unamplified current conducted by the first transistor;
   3. a first reference resistor coupled to the first transistor for receiving the current conducted by the first transistor; and
   4. a second reference resistor coupled to the second transistor for receiving the current conducted by the second transistor, wherein the first reference resistor is configured to have a resistance that is proportional to and greater than a resistance of the second reference resistor; and
  iv. a cross coupling circuit coupled to the first driving circuit and to the second driving circuit for decreasing a switching response time of the write current.

28. The magnetic storage system according to claim 27 wherein the cross coupling circuit includes:
 a. a first terminal coupled to the output terminal for providing a feedforward path to a first current;
 b. a second terminal coupled to the current amplifier for supplying the first current to the current amplifier such that a second current which is proportional to and greater than the first current is simultaneously formed in the switching circuit, wherein the second current increases the write current available for the inductive element; and
 c. a feedforward element coupled to the first terminal and to the second terminal for controlling the first current.

29. The magnetic storage system according to claim 28 wherein the feedforward element includes a resistor and a capacitor coupled in series between the first terminal and the second terminal, and each configured to control a magnitude of the first current.

30. The magnetic storage system according to claim 29 wherein the feedforward element further includes a voltage buffer coupled to the first terminal and to the resistor for providing an appropriate bias voltage to the feedforward element.

31. The magnetic storage system according to claim 30 wherein the feedforward element is configured for coupling in a differential arrangement to the output terminal and to the current amplifier.

32. The magnetic storage system according to claim 27 further comprising a damping circuit coupled to the switching circuit and to the second driving circuit for reducing an undershoot and a settling time of the write current.

33. The magnetic storage system according to claim 32 wherein the damping circuit includes:
 a. a feedback input coupled to the first and second output terminals for providing a negative feedback path to a third current;
 b. a feedback output coupled to the current amplifier for supplying the third current to the current amplifier such that a fourth current which is proportional to and greater than the third current is simultaneously formed in the switching circuit, wherein the fourth current damps a ringing associated with the write current; and
 c. an impedance element coupled to the feedback input and to the feedback output for adjusting a waveform of the third current to enhance a damping function performed by the fourth current on the write current.

34. The magnetic storage system according to claim 33 wherein the impedance element includes a feedback resistor and a feedback capacitor coupled in series between the feedback input and the feedback output, and each configured to control a waveform of the third current.

35. The magnetic storage system according to claim 34 wherein the impedance element is configured for coupling in a differential arrangement to the first and second output terminals and to the current amplifier.

\* \* \* \* \*